United States Patent
Hattori

(10) Patent No.: US 11,274,487 B2
(45) Date of Patent: Mar. 15, 2022

(54) ROOF OPENING/CLOSING SYSTEM

(71) Applicant: Toyota Jidosha Kabushiki Kaisha, Toyota (JP)

(72) Inventor: Masaya Hattori, Kitanagoya Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 16/599,542

(22) Filed: Oct. 11, 2019

(65) Prior Publication Data
US 2020/0115950 A1   Apr. 16, 2020

(30) Foreign Application Priority Data
Oct. 15, 2018 (JP) ............................. JP2018-194402

(51) Int. Cl.
| | |
|---|---|
| *E05F 15/72* | (2015.01) |
| *E05F 15/50* | (2015.01) |
| *B60J 7/12* | (2006.01) |

(52) U.S. Cl.
CPC .............. *E05F 15/72* (2015.01); *E05F 15/50* (2015.01); *B60J 7/12* (2013.01); *E05Y 2201/448* (2013.01); *E05Y 2900/542* (2013.01)

(58) Field of Classification Search
CPC ... E05F 15/72; E05F 15/50; B60J 7/12; E05Y 2201/448; E05Y 2900/542; E05Y 2800/414; E05Y 2800/416; E05Y 2400/50
See application file for complete search history.

(56) References Cited

U.S. PATENT DOCUMENTS

| | | | | |
|---|---|---|---|---|
| 6,054,821 A | * | 4/2000 | Koch | B60J 7/0573 236/49.3 |
| 2003/0005692 A1 | * | 1/2003 | Mentink | F15B 21/08 60/456 |
| 2006/0178795 A1 | * | 8/2006 | Queveau | B60J 7/0573 701/49 |
| 2012/0221188 A1 | * | 8/2012 | Kelly, III | B60K 35/00 701/29.1 |
| 2017/0077845 A1 | * | 3/2017 | Ruoff | H02P 5/68 |
| 2020/0115949 A1 | * | 4/2020 | Jager | E05F 15/71 |

FOREIGN PATENT DOCUMENTS

| | | | | |
|---|---|---|---|---|
| CA | 2399950 | * | 8/2001 | B60K 35/00 |
| FR | 2971202 | * | 8/2012 | E05F 15/49 |
| JP | H05254347 A | | 10/1993 | |
| JP | 2007-237789 A | | 9/2007 | |
| JP | 2009002058 | * | 1/2009 | E05F 15/40 |
| JP | 2014-121953 A | | 7/2014 | |
| KR | 20120014444 | * | 2/2012 | H01H 13/00 |

* cited by examiner

*Primary Examiner* — Peter D Nolan
*Assistant Examiner* — Kenneth M Dunne
(74) *Attorney, Agent, or Firm* — Dinsmore & Shohl LLP

(57) ABSTRACT

A roof opening/closing system of a convertible vehicle includes an opening/closing device for opening/closing the roof of the convertible vehicle; and a controller for determining, with respect to at least one of the opening and closing operations by the opening/closing device, whether to enable or disable the operation; and a notifying device for notifying a user whether the operation is enabled or disabled as determined by the controller. For example, in the case where the burning protection is turned off, following the determination based on the condition relevant to burning protection, lift of prohibition of the roof operation is notified when other permitting conditions for the roof operation are fulfilled.

2 Claims, 3 Drawing Sheets

ROOF OPENING/CLOSING SYSTEM

CROSS REFERENCE TO RELATED APPLICATION

This application claims priority to Japanese Patent Application No. 2018-194402 filed on Oct. 15, 2018, which is incorporated herein by reference in its entirety including the specification, claims, drawings, and abstract.

TECHNICAL FIELD

The present disclosure relates to a roof opening/closing system for a convertible vehicle.

BACKGROUND

A convertible vehicle having an opening/closing device for opening/closing a roof thereof is available. The opening/closing device receives, for example, a switching operation by a user, and automatically opens/closes the roof with a drive force. The opening/closing device performs control so as to prohibit its operation, for example, upon detection of abnormality.

JP 05-254347A discloses display of a message to a user (an occupant) to inform of abnormality in a roof opening/closing device. Items for abnormality are classified based on significance. Message display is performed with priority to an item for abnormality with higher significance with the intention of improving workability in repairing.

SUMMARY

Whether opening/closing of a roof by an opening/closing device is enabled or disabled depends on not only breakdown but also on temporal factors that are recoverable without repair. For example, if the temperature of the opening/closing device or the vehicle speed does not fulfill a predetermined condition, opening/closing of the roof is temporarily prohibited. This temporal prohibition will be lifted to permit opening/closing of the roof as the situation changes. In view of the above, it is desired to improve the accuracy of a notice addressed to a user using the roof opening/closing device to inform whether opening/closing of the roof is enabled or disabled to thereby prevent erroneous recognition by the user.

The present disclosure aims to reduce or prevent erroneous recognition by a user concerning whether opening/closing of a roof is enabled or disabled.

According to one aspect of the present disclosure, there is provided a roof opening/closing system including an opening/closing device for opening/closing the roof of a convertible vehicle; a controller for determining, with respect to at least one of the opening and closing operations of the opening/closing device, whether to enable or disable the operation; and a notifying device for notifying a user whether the operation is enabled or disabled as determined by the controller.

In one embodiment of the present disclosure, conditions based on which the controller determines whether to enable or disable the operation may include a condition relevant to burning protection for the opening/closing device, and the notifying device may notify the user that the operation is enabled at a timing at which the result of determination, as to whether to enable or disable the operation is changed to enabling, the determination being based on the condition relevant to the burning protection.

According to the present disclosure, it is possible to reduce or prevent, for example, erroneous recognition of, for example, breakdown in determining whether to enable or disable a roof operation.

BRIEF DESCRIPTION OF DRAWINGS

Embodiment(s) of the present disclosure will be described based on the following figures, wherein.

DESCRIPTION OF EMBODIMENTS

An embodiment of the present disclosure will be described now with reference to the accompanying drawings. In the description, specific aspects will be described for ready understanding of the present disclosure. These, however, are given only as examples of the embodiments, and various other embodiments are possible.

Figure 1:
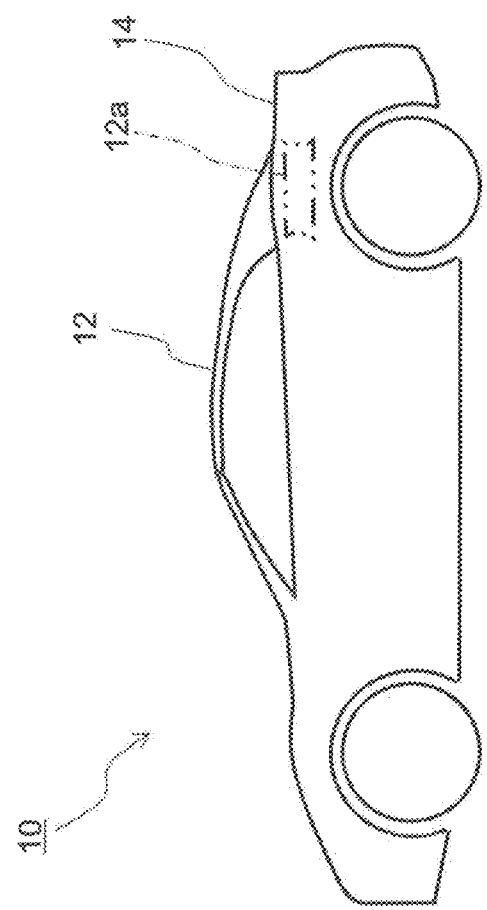
FIG. 1 is a schematic side view of a convertible vehicle according to an embodiment.

FIG. 1 is a schematic side view of a convertible vehicle 10 according to an embodiment. In FIG. 1, the soft top roof 12 of the convertible vehicle 10 is closed. The soft top roof 12 is a roof made of soft material, such as fabric. The soft top roof 12 is formed so as to have a predetermined shape, for example, with a metal frame when necessary.

The soft top roof 12 has a structure that can be opened or closed in response to an instruction from a user only while the user continues to conduct a switching operation. The soft top roof 12 in an open state is folded and stored in a roof storage 12a provided in a rear portion of the vehicle. In general, the roof storage 12a is provided separately from a trunk compartment 14 for baggage, for example. The roof storage 12a has a cover, or a tonneau cover, that constitutes a part of a roof opening/closing device to be described later. Alternatively, the roof storage 12a can be formed inside the trunk compartment 14. The soft top roof 12 changes from being in an open state to being in a closed state or vice versa. This process of change will complete in a short period of time, such as about ten to thirty seconds, for example.

Figure 2:
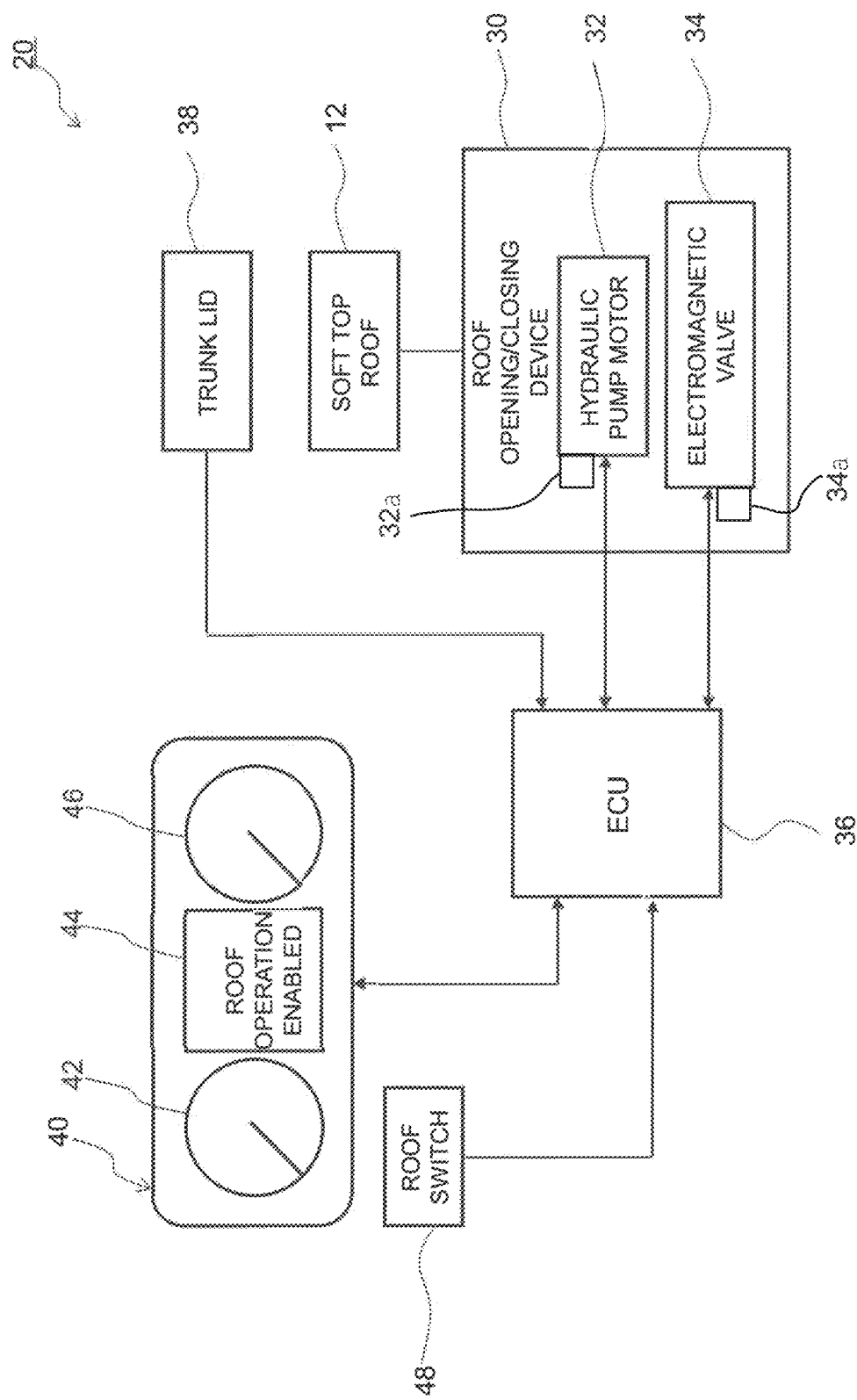
FIG. 2 is a block diagram illustrating a schematic structure of a roof op ling/closing system.

FIG. 2 is a block diagram illustrating a schematic structure of a roof opening/closing system 20 that opens and closes the soft top roof 12. The roof opening/closing system 20 includes the soft top roof 12, a roof opening/closing device 30, an ECU 36, a trunk lid 38, an instrument panel 40, and a roof switch 48.

The roof opening/closing device 30 is a device that drives the soft top roof 12. The roof opening/closing device 30 includes a hydraulic pump motor 32 an a plurality of electromagnetic valves 34. The hydraulic pump motor 32 is a motor that supplies hydraulic oil to a cylinder. Specifically, the electromagnetic valves 34 are opened/closed at a programed timing so that the hydraulic oil is supplied to the cylinder to drive the cylinder. With the above, the roof opening/closing device 30 opens or closes the soft top roof 12. Each of the hydraulic pump motor 32 and the electromagnetic valve 34 has a temperature sensor 32a and 34a, respectively, and sends temperature information to the ECU 36. Examples of the temperature sensors 32a and 34b include thermistors and thermocouples. The hydraulic, pump motor 32 or the electromagnetic valve 34 may include any device other than a temperature sensor to estimate the temperature. For example, the ECU 36 may estimate the temperature, based on the amount of power supplied to a circuit that drives the hydraulic pump motor 32 or the electromagnetic valve 34 or based on a power-on period of time.

The ECU 36, or the electronic control unit 36, is a computer device mounted on the convertible vehicle 10. The ECU 36 drives arithmetic processing hardware, following a program, to execute various control for the convertible vehicle 10. Specifically, the ECU 36 instructs the hydraulic pump motor 32 and the electromagnetic valve 34 to operate. In addition, the ECU 36 obtains temperature information on the hydraulic pump motor 32 and the electromagnetic valve 34 from the temperature sensor 32a and the temperature sensor 34a, respectively, and executes control for burning protection for the roof opening/closing device 30 (switching between an on state and an off state of the burning protection), based on the temperature information obtained. Note that burning protection is to prohibit the operation of the roof opening/closing device 30 for the sake of preventing breakdown of the roof opening/closing device 30 when the temperature of the roof opening/closing device 30 becomes very high. Whether the burning protection is in an on state or in an off state is one of the temporal factor-based enabling/disabling conditions for enabling or disabling opening/closing of a roof. Specifically, with the burning protection in an on state, the opening/closing operation of the roof opening/closing device 30 is prohibited and thus disabled. The ECU 36 also makes determination concerning other temporal factor-based enabling/disabling conditions for opening/closing of the roof. Examples of such enabling/disabling conditions include conditions concerning the state; that is, open or closed, of the trunk lid 38, the state of the ignition switch, the vehicle speed, a decrease in voltage due to use of an air conditioning system. That is, the ECU 36 functions as a controller for determining, based on the enabling/disabling conditions, whether to enable or disable opening/closing of the roof by the roof opening/closing device 30. The ECU 36 is also connected to, for example, the trunk lid 38, the instrument panel 40, and the roof switch 48, and executes processing to be described below.

The trunk lid 38 is a cover of the trunk compartment 14. The convertible vehicle 10 according to an embodiment is designed such that the operation of the roof is stopped while the trunk lid 38 is open. Further, control is performed so as to disable a user's opening the trunk lid 38 by operating a trunk switch while the roof is in operation. A user, however, can open the trunk lid 38, even with the roof in operation, by operating a cable button or a trunk key cylinder, which is free from intervention by control. The trunk lid 38 has a sensor for detecting whether the trunk lid 38 is open or closed. The result of detection is outputted to the ECU 36.

The instrument panel 40 is mounted ahead of the driver seat of the convertible vehicle 10. The instrument panel 40 includes, for example, a speedometer 42, a multi-functional display 44, and a tachometer 46. Among these, the multi-functional display 44 shows a variety of information which the ECU 36 presents to a driver (a user). The information shown on the multi-functional display 44, which serves a role as a notifying device, includes information concerning opening/closing of the soft top roof 12, the information being based on the result of determination for burning protection.

The roof switch 48 is a switch disposed near the instrument panel 40. Alternatively, the roof switch 48 may be disposed on the instrument panel 40. The roof switch 48 is connected to the ECU 36 and sends a signal to the ECU 36 when a driver presses the roof switch 48. After determining, based on the enabling/disabling condition, whether to enable or disable the roof operation, the ECU 36 changes the state of the soft top roof 12 from an open state to a closed state or vice versa.

Figure 3:
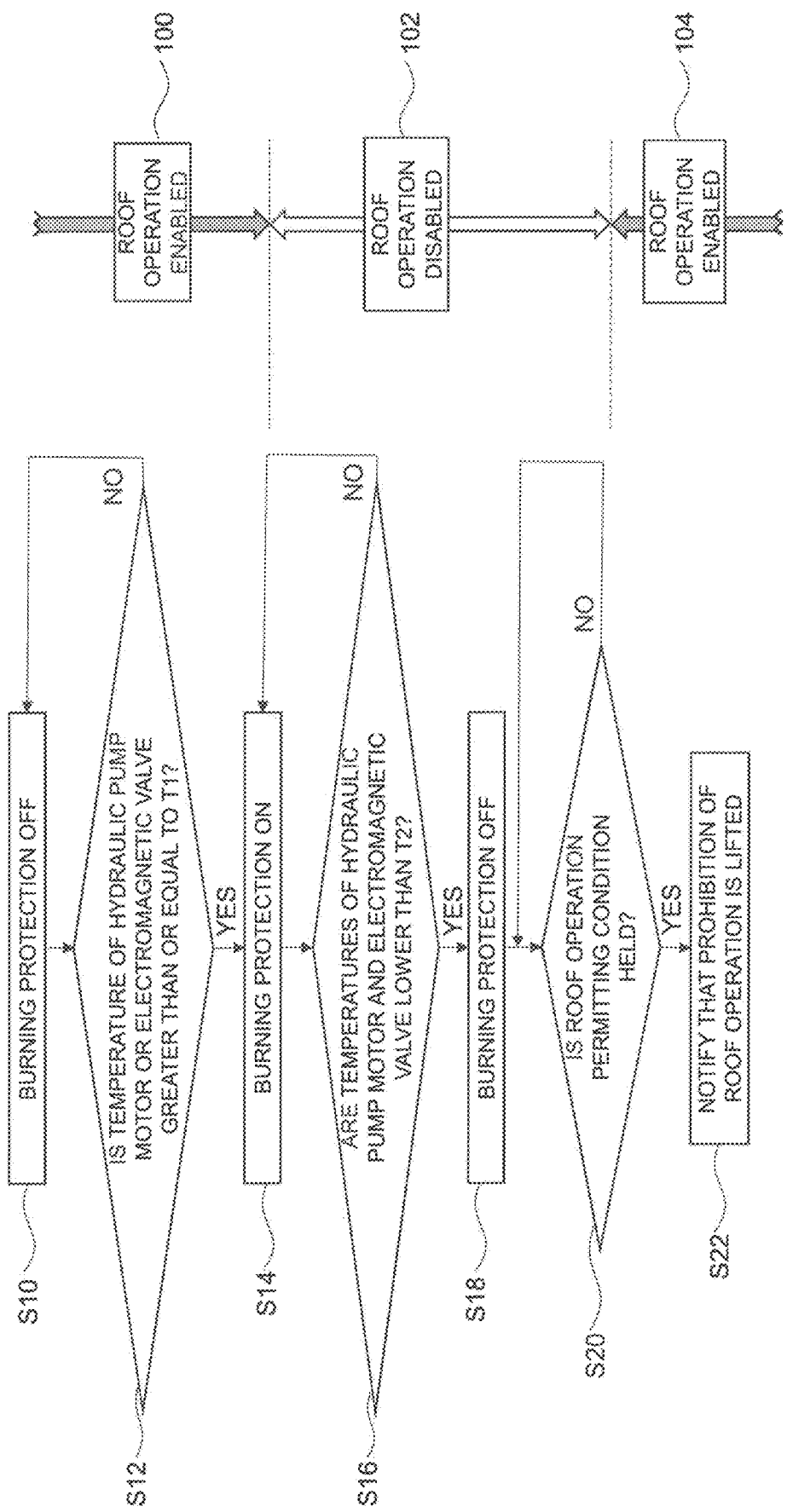
FIG. 3 is a flowchart of processing to be executed by a roof opening/closing system, with indication of change in the states resulting from the processing.

By reference to to FIG. 3, processing to be executed in the roof opening/closing system 20, including control for burning, protection for the roof opening/closing device 30, will be described. FIG. 3 is a flowchart of the processing to be executed by the ECU 36 (left side in the drawing), with indication of the state; namely, whether the roof operation is enabled or disabled, resulting from the processing (right side in the drawing).

The description below begins with the initial state in which the burning protection is in an off state (S10) and other roof operation enabling/disabling conditions enable a roof operation, so that the operation of the soft top roof 12 is enabled (100).

At this stage, the ECU 36 monitors to determine whether the temperature of the hydraulic pump motor 32 or the electromagnetic valve 34 is greater than or equal to the operation prohibiting temperature T (S12). The operation prohibiting temperature T1 is set within a range of temperature at which the hydraulic pump motor 32 and the electromagnetic valve 34 can operate without breakdown due to burning. Although the operation prohibiting temperature of the hydraulic pump motor 32 and that of the electromagnetic valve 34 are both set to T1 for simplification of the description here, such temperatures can be set differently depending on the respective characteristics.

In the case where the temperature of the hydraulic pump motor 32 and that of the electromagnetic valve 34 are both lower than the operation prohibiting temperature T1 (No at S12), the burning protection is kept in an off state (S10). Thereafter, monitoring the temperature of the hydraulic pump motor 32 and that of the electromagnetic valve 34 at S12 will be conducted again at a next timing. Monitoring may be set to be conducted either constantly at an appropriate frequency (for example, for every ten seconds) or for example, only when the roof opening/closing device 30 is to be used or expected to be used (such as when the ignition key is turned on).

When either one or both of the temperature of the hydraulic pump motor 32 and that of the electromagnetic valve 34 are equal to the operation prohibiting temperature T1 or higher (Yes at S12), the burning protection turns into an on state (S14). Burning protection in an on state means a state that provokes a determination that the roof operation should be disabled (102). In other words, following the state of burning protection, which is one of the operation enabling/disabling conditions for enabling or disabling the operation of the soft top roof 12, turning into an on state, the roof operation is disabled. In the above, however, disabling the roof operation immediately after the condition at S12 is fulfilled may not always be appropriate, depending on the state of the soft top roof 12. For example if the soft top roof 12 is in the process of being opened or closed, completion of the opening or closing operation should be awaited before the burning protection is set in an on state. In addition, disabling the roof operation with the soft top roof 12 in an open state is not appropriate, as security and rainfall measures cannot be taken. In view of the above, setting the burning protection in an on state may be permitted only with the soft top roof 12 closed. Such an arrangement can be achieved by setting the operation prohibiting temperature T1 to a temperature slightly lower than a temperature at which the hydraulic pump motor 32 or the electromagnetic valve 34 are expected to actually burn.

After the burning protection has turned into an on state (S14), the temperature of the hydraulic pump motor 32 and that of the electromagnetic valve 34 are monitored to see if those temperatures have both dropped below a temperature T2 at which a roof operation is permitted again, or a re-operation permitting temperature T2 (S16). The reoperation permitting temperature T2 is set to a value that allows the temperature T2 to have a relationship "T1>T2" relative to the temperature T1. Note here that the temperature of the hydraulic pump motor 32 and that of the electromagnetic valve 34 will normally fail below the re-operation permitting temperature 72 after elapse of some time (for example, about ten minutes, depending on the outside temperature) through natural heat discharge. Thus, temperature monitoring will be conducted repetitively at a short interval (for example, five seconds) (No at S16).

When the temperature of the hydraulic pump motor 32 and that of the electromagnetic valve 34 have both dropped below the re-operation permitting temperature T2 (Yes at S16), the burning protection turns into an off state (S18). Note here that the condition that the burning operating is in an off state is merely one condition that enables a roof operation. Hence, whether all other enabling/disabling conditions as well enable a roof operation (in other words, whether a condition that permits a roof operation, or a roof operation permitting condition, is held) is thereafter determined (S20). Examples of the permitting conditions include that the ignition switch is in an on state, that the trunk lid 38 is open, that the vehicle speed is less than or equal to a predetermined speed, and that the voltage is a predetermined value or over.

In the case where it is determined that the roof operation permitting conditions are not held, such a determination will thereafter be made repetitively to see whether the permitting conditions are held (No at S20). On the other hand, in the case where it is determined that the roof operation permitting conditions are held (Yes at S20), the roof operation is enabled (104), and the fact that the prohibition of a roof operation has been lifted is notified (S22). Specifically, the notice is given by displaying a message read as, for example, "prohibition of roof operation lifted" or "roof operation enabled" on the multi-functional display 44 of the instrument panel 40. Seeing the message, a user can know that operation of the soft top roof 12 is now enabled.

This message display may be performed constantly. That is, once the roof operation is enabled, a message to that cried may start being displayed on the multi-functional display 44 and maintained until the roof operation is prohibited.

Message display on the multi-functional display 44, however, may be construed to be able to increase a user's satisfaction if only strictly selected highly important information is displayed. In view of the above, display of a message on the multi-functional display 44 may be continued only for a predetermined period of time after the roof operation is enabled. According to this aspect, a message displayed on the multi-functional display 44 will be erased after elapse of a predetermined period of time, for example, ten seconds, thirty seconds, one minute, or five seconds.

Alternatively, such display of a message on the multi-functional display 44 may be made only when it is assumed that a user is highly likely to instruct opening or closing of the soft top roof 12. Examples of such cases include a case in which a user presses the roof switch 48 after the roof operation has been disabled. In this case, the soft top roof 12 will not be opened or closed despite the user's instruction to open/close the soft top roof 12, because the burning protection is in an on state. Thus, it is assumed that the user is likely pressing the roof switch 48 again. On the contrary, in the case where time has passed without the user's pressing the roof switch 48 after the roof operation has been disabled until the roof operation is enabled again, it is assumed that the user is less likely to want to open/close the soft top roof 12. In such a case, no such display is particularly made.

Note that the notice addressed to a user at S22 may be implemented using a speaker by outputting sound, such as human voice or buzzer sound, instead of or in combination with display of a message on the multi-functional display 44. As an example, an aspect in which no message is displayed on the multi-functional display 44 and only sound is used in notifying a user is possible. Alternatively, message display or audial notice addressed to a user can be made using a vehicle-mounted device, such as a navigation system, other than the multi-functional display 44, or devices not mounted on the vehicle, such as tablet terminals or smartphones (movable terminals which a user can carry).

In the above description, only the burning protection is referred to as a target of the special processing illustrated in FIG. 3. It is possible to execute similar processing with respect to enabling/disabling conditions based on some or all of other factors. Moreover, it is also possible to execute similar processing with respect to some or all of enabling/disabling conditions based on temporal factors other than the burning protection. With the above, a user can realize that opening/closing of the roof is now enabled at a timing at which a concerned permitting condition has changed from disabling the operation to enabling the operation. Moreover, also at a timing at which the result of determination based on such enabling/disabling conditions changes from enabling the operation to disabling the operation, a message to that effect may be displayed on the multi-functional display 44. Seeing the message, a user can realize that opening/closing of the soft top roof 12 is now disabled (or prohibited) at a timing at which a concerned enabling/disabling condition has changed from enabling the operation to disabling the operation.

On the other hand, executing the processing illustrated in FIG. 3 only with respect to the burning protection too is meaningful. In particular, as for the other temporal factor-based enabling/disabling conditions, such as conditions relevant to the states of the ignition switch, the trunk lid 38, the vehicle speed, and the voltage, a user can readily recognize the states as a result of his/her behavior or through its visual or audial senses, and can change the states into those that enable or disenable the roof operation by operating accordingly. Thus, it can be construed that, if any of such situations is changed and resultantly whether the roof operation is enabled or disabled is temporarily switched, notifying a user of such temporal switching is unnecessary. Rather, not notifying a user of such switching can be desirable in view of simplicity in message display on the multi-functional display 44.

The burning protection, on the other hand, is related to the temperature of the hydraulic pump motor 32 and the electromagnetic valve 34, which a user usually cannot recognize. Moreover, although being unable to be easily changed by a user, the temperature will decrease through natural heat discharge in a relatively short period of time, and any relevant problem will be accordingly solved. Thus, it is advantageous to notify a user whether the roof operation is enabled or disabled at a timing at which the state of the burning protection is switched. As a result, the user can immediately operate the roof.

In the above description, a convertible vehicle 10 having the soft top roof 12 has been described as an example. The present disclosure can be similarly applied to a convertible vehicle having a hard top roof.

In the above description, a user is assumed to be an occupant of the convertible vehicle 10. Alternatively, a user not on board the convertible vehicle 10 can execute an operation for the roof. Specifically, a user outside a vehicle can, operate the roof, for example, using a mobile terminal which the user can carry, such as a tablet terminal or smartphone, or a vehicle key (these being collectively referred to as remote operating devices). In view of the above, whether the operation of the opening/closing device is enabled or disabled may be notified to a user, using a remote operation device, such as a mobile terminal.

REFERENCE SIGNS LIST 10 convertible vehicle, 12 soft top roof, 12a roof storage, 14 trunk room, 20 roof opening/closing system, 30 roof opening/closing device, 32 hydraulic pump motor, 32a temperature sensor, 34 electromagnetic valve, 34a temperature sensor, 36 ECU, 38 trunk lid, 40 instrument pane 1, 42 speed meter, 44 multi-functional display, 46 tachometer, 48 roof switch.

The invention claimed is:

1. A roof opening and closing system, comprising:
   an opening and closing device for opening and closing a roof of a convertible vehicle, the opening and closing device including a motor; and
   a controller for determining, with respect to at least one of opening and closing operations of the opening and closing device, whether to enable or disable the operation; and
   a notifying device for notifying a user when the operation is enabled and when the operation is disabled as determined by the controller, the notifying device including a display screen, wherein
   conditions based on which the controller determines whether to enable or disable the operation include a condition relevant to burning protection for the opening and closing device, and
   the notifying device notifies the user that the operation is enabled at a timing at which a result of determination as to whether to enable or disable the operation is changed to enabling, the determination being made based on the condition relevant to the burning protection.

2. A roof opening and closing system, comprising:
   an opening and closing device for opening and closing a roof of a convertible vehicle, the opening and closing device including a motor; and
   a controller for determining, with respect to at least one of opening and closing operations of the opening and closing device, whether to enable or disable the operation; and
   a notifying device for notifying a user whether the operation is enabled or disabled as determined by the controller, the notifying device including a display screen, wherein
   conditions based on which the controller determines whether to enable or disable the operation include a condition relevant to burning protection for the opening and closing device, and
   the notifying device notifies the user that the operation is enabled at a timing at which a result of determination as to whether to enable or disable the operation is changed to enabling, the determination being made based on the condition relevant to the burning protection.

* * * * *